United States Patent [19]

Nakamoto et al.

[11] 4,018,570

[45] Apr. 19, 1977

[54] COMPOSITE OF A METALLIC MATERIAL AND VULCANIZED RUBBER

[75] Inventors: Yuzuru Nakamoto, Kodaira; Eishi Kubota, Kokubunji; Fukushi Suzuki, Kodaira, all of Japan

[73] Assignee: Bridgestone Tire Company Limited, Tokyo, Japan

[22] Filed: Jan. 30, 1976

[21] Appl. No.: 653,775

Related U.S. Application Data

[62] Division of Ser. No. 447,631, March 4, 1974, Pat. No. 3,961,740.

[30] Foreign Application Priority Data

Mar. 12, 1973 Japan .............................. 48-27925

[52] U.S. Cl. .................................. 152/359; 75/157; 428/545

[51] Int. Cl.$^2$ .......................................... B32B 15/06

[58] Field of Search ...................... 29/195 E; 75/157

[56] References Cited

UNITED STATES PATENTS

| | | | |
|---|---|---|---|
| 260,020 | 6/1882 | Greacen | 29/195 |
| 2,078,917 | 4/1937 | Malone | 29/195 |
| 2,746,135 | 5/1956 | Harris | 29/195 |
| 2,939,207 | 6/1960 | Adler | 29/195 |

*Primary Examiner*—L. Dewayne Rutledge
*Assistant Examiner*—E. L. Weise

[57] ABSTRACT

A composite of a metallic material and vulcanized rubber is produced by contacting an unvulcanized rubber with a metallic material coated with a ternary alloy composed of copper, zinc and tin.

4 Claims, No Drawings

COMPOSITE OF A METALLIC MATERIAL AND VULCANIZED RUBBER

This is a division of application Ser. No. 447,631, filed Mar. 4, 1974, now U.S. Pat. No. 3,961,740 dated June 8, 1976.

BACKGROUND OF THE INVENTION

1. Field of the Invention

This invention relates to a composite of a metallic material and vulcanized rubber.

More particularly, this invention relates to a composite such as a tire, a belt and a hose which comprises an improved adhesion between the metallic material and vulcanized rubber.

2. Description of the Prior Art

Heretofore, upon preparing a composite composed of the metallic material and vulcanized rubber, the surface of the metallic material was coated with brass in order to obtain an improved adhesion strength between the metallic material and vulcanized rubber.

However, when the high adhesion strength is desired in said brass coating process it was necessary to prevent the deterioration of the surface of the metallic material due to the moisture attached thereto during the production stages, and also to avoid that the moisture enters the rubber, or to prevent the rubber from absorbing the moisture.

Further, when placed under a highly humid atmospheric condition, it was extremely difficult that the metallic material and the rubber are kept free from the moisture.

Accordingly, this tends to occur the defaults such that the adhesion strength between the metallic material and vulcanized rubber is lowered remarkably, and that the rubber peels off the metallic material. When a composite was a tire, the earlier damage of the tire was often resulted.

As set forth in Japanese Patent Application No. 44648/1971, the present inventors have carried out the method of coating additionally a thin film of the metals in Group IV of the Periodic Table on the surface of the metallic material which was previously coated with brass so that consistently high adhesion between the metallic material and rubber may be preserved without an adverse effect due to the moisture.

However, according to the above method, it was necessary to carry out twice the thin film coating of said metals.

SUMMARY OF THE INVENTION

An object of the present invention is to provide a composite of a metallic material and vulcanized rubber which comprises consistently high adhesion achieved only by one time coating without lowering said adhesion between the metallic material and vulcanized rubber due to the moisture attached to the surface of the metallic material as well as the water content of the rubber. The problem of the repeated coating as mentioned above has been eliminated by achieving that above object of this invention.

According to the present invention, there is provided a composite of a metallic material and vulcanized rubber prepared by contacting an unvulcanized rubber with a metallic material and unifying them by vulcanization, wherein the improvement comprises coating previously at least the contact surface of said metallic material and the unvulcanized rubber with a ternary alloy composed of copper, zinc, and tin.

DESCRIPTION OF THE PREFERRED EMBODIMENTS

The substrate of the metallic material in accordance with the present invention is the metallic material used in a composite with rubber, such as, for example, a carbon steel, which has a good reinforcing property for the rubber.

In the composition of that ternary alloy composed of copper, zinc and tin which is applied to coat the metallic material, not less than two percents by weight of tin is to be contained in order to prevent the decrease of adhesion strength.

From the standpoint of the workability of the metallic material after coating of the ternary alloy thereon and another standpoint of the adhesion to the rubber and the like, the ternary alloy should be composed of 59 – 73% by weight of copper, 23 – 34% by weight of zinc, and 2 – 13% by weight of tin, and preferably the weight ratio of copper to zinc ranging from 70:30 to 65:35, and the weight ratio of the total amount of copper and zinc to the amount of tin ranges from 100:3 to 100:10.

A method of coating the metallic material with the ternary alloy may be appropriately selected from various conventional coating methods such as electrical plating, hot dipping, metal spraying and the like.

This thickness of the coated film of the ternary alloy is not less than 0.1 microns.

As the unvulcanized rubber to be contacted with the metallic material in accordance with the present invention, either of natural rubber, synthetic rubber or the mixture of natural rubber and synthetic rubber may be used effectively.

As the compounding ingredients, conventional ingredients used in order to increase the adhesion between the metallic material and the rubber may be incorporated into the rubber. Preferable compounding ingredients are cobalt salt of organic acids such as cobalts naphthenate, cobalt dithiocarbamate, cobalt oleate, cobalt octylate and the like.

As mentioned above, the present invention has solved the problem in the course of production that the adhesion between the metallic material and vulcanized rubber is lowered and degradation of the metallic material is caused by the moisture attached thereto, and the moisture contained in said rubber, and thereby provided a composite comprising consistently high adhesion such as represented by a highly durable tire when the composite is tire.

Further, according to the present invention it has been eliminated to install an air conditioned device required in the storing stage of the metallic material and in the production stage of said composite, and commerically remarkable effects have been brought in regard to a simplification of the device, and to an excellent preservation of the metallic material.

The following examples are given merely as illustrations of the present invention and it is to be understood that the invention is not limited thereto. In the examples, parts and percents are by weight unless otherwise specified.

EXAMPLE 1

Plates (150.0 × 25.4 × 3.0 mm) of carbon steel were coated with each of ternary alloys having various compositions of copper, zinc and tin in the thickness of about 0.1–0.2 mm. by the metal spraying process to prepare the metallic material. Each metallic material was unified with the unvulcanized rubbers which have various water content and such a composition as listed in Table 1 by vulcanization for 1 hour at 145° C, and thereafter the adhesion strength was measured, and the results were shown in Table 2 below. Water was added to the above mentioned unvulcanized rubber on the roll after mixing stage thereof, and the water content of said rubber was determined by gas chromatography and by measuring volatilized weight just prior to the vulcanization step. The adhesion strength was measured three times by using a Load-cell type tension tester and the average values thereof were shown in the following Table.

Table 1

| Rubber Compounding | Parts |
|---|---|
| Natural rubber | 100 |
| Carbon black | 50 |
| ZnO | 7 |
| S | 3 |
| N-cyclohexyl benzothiazyl sulphenamide | 0.5 |
| Phenyl-β naphthylamine | 1 |
| Alkyl phenol resin | 5 |
| Cobalt naphthenate | 3 |

Table 2

| Test No. | | 1 Prior Art | 2 Present Invention | 3 Present Invention | 4 Present Invention | 5 Present Invention |
|---|---|---|---|---|---|---|
| Composition of the ternary alloy (weight %) | Cu | 70.0 | 68.0 | 66.6 | 63.6 | 60.9 |
| | Zn | 30.0 | 29.1 | 28.6 | 27.3 | 26.1 |
| | Sn | 0 | 2.9 | 4.8 | 9.1 | 13.0 |
| | Water content of rubber (weight %) | | | | | |
| Adhesion strength (Kg/inch) | 0.5 | 65 | 72 | 78 | 90 | 90 |
| | 1.3 | 32 | 55 | 62 | 84 | 86 |
| | 2.0 | 10 | 40 | 48 | 78 | 75 |
| | 3.0 | 0 | 2 | 5 | 40 | 42 |

It is clear from Table 2 above that the adhesion strength between the carbon steel plates and vulcanized rubber increases in proportions as the tin content of the ternary alloy increases, and when about 9% by weight of tin is contained in said alloy the enhancement of the adhesion strength reaches an approximately constant level.

And also, it should be noted that in proportion to the increase of the water content of the unvulcanized rubber, the more remarkable effect of the present invention can be obtained.

EXAMPLE 2

The metallic material coated with the ternary alloy in a manner similar to the manner shown in Example 1 was allowed to stand in an atmosphere of 90% RH (Relative Humidity) at 40° C in order to absorb the moisture, and thereafter unified with the unvulcanized rubber, water content of which was 1.4% by weight, by vulcanization in the same manner as shown in Example 1. The adhesion strength of the resulting composite was indicated in Table 3 below.

Table 3

| Test No. | | 6 Present Invention | 7 Present Invention | 8 Present Invention | 9 Present Invention | 10 Present Invention |
|---|---|---|---|---|---|---|
| Composition of the ternary alloy (weight %) | Cu | 70.0 | 68.0 | 66.6 | 63.6 | 60.9 |
| | Zn | 30.0 | 29.1 | 28.6 | 27.3 | 26.1 |
| | Sn | 0 | 2.9 | 4.8 | 9.1 | 13.0 |
| | Time of standing at 40° C, 90% RH, (day) | | | | | |
| Adhesion strength (Kg/inch) | 0 | 38 | 55 | 60 | 86 | 90 |
| | 1 | 35 | 60 | 68 | 90 | 92 |
| | 3 | 28 | 65 | 72 | 92 | 90 |
| | 6 | 0 | 28 | 35 | 65 | 63 |

The test results show clearly that the adhesion strength between the metallic material and unvulcanized rubber as well as the preservance of the metallic material increase in proportion to the tin content of the ternary alloy, and when about 9% by weight of tin is contained in said alloy, the increase of the adhesion strength and the preservance property reach an approximately constant level.

As seen from the results of the tests, deterioration of metallic material according to the present invention seems not to be caused easily by the moisture attached to the surface thereof.

We claim:

1. A composite product which is a metallic base and a vulcanized rubber with an intermediate adhesive layer which is a tertiary alloy containing from 59 to 73% by weight copper, 23 to 34% by weight zinc, and 2 to 13% by weight tin.

2. A product as in claim 1 wherein the composition ratio of the ternary alloy is such that the weight ratio of copper to zinc is from 70:30 to 65:35, and the weight ratio of the total content of copper and zinc to that of tin is from 100:3 to 100:10.

3. A product of claim 1 wherein a cobalt salt of an organic acid is incorporated into the rubber.

4. A product of claim 1 which is a pneumatic tire reinforced by steel cord.

* * * * *